July 12, 1955  F. G. LOGAN  2,712,684
POWER TRANSMISSION
Filed July 30, 1949

*INVENTOR.*
FRANK G. LOGAN
BY
*Ralph L. Tweedale*
ATTORNEY

United States Patent Office 2,712,684
Patented July 12, 1955

2,712,684

POWER TRANSMISSION

Frank G. Logan, Kirkwood, Mo., assignor to Vickers Incorporated, Detroit, Mich., a corporation of Michigan Application July 30, 1949, Serial No. 107,799

13 Claims. (Cl. 29—25.3)

This invention relates to methods of and circuits for electroforming rectifier cells.

In the manufacture of rectifier cells, for example, metallic rectifiers such as the selenium type rectifier cell, after their mechanical structure is completed, they undergo what is known as an electroforming process to improve the stability and the rectification ratio of the cell. Customarily, a plurality of such cells are connected in series to which series string suitable voltages and currents for electroforming are applied. In some cases, it is desirable to connect a plurality of such series strings of rectifiers in parallel to form a plurality of parallel branches each having a number of rectifier cells connected in series, and then apply electroforming currents to the parallel connected branches. While being electroformed, the reverse resistance of a rectifier cell increases, but the increase is not the same for all rectifier cells even if they are otherwise substantially similar dimensionally and structurally. Also, some cells burn out and become shorted. For either reason, a resistive unbalance can and often does occur between parallel branches causing excessive current flow in the branch having the lowest resistance, and in addition, where the voltage applied to the electroforming circuit is not constant, robbing cells in a higher resistance branch of their necessary forming currents.

The invention herein automatically maintains desirable forming currents and substantially balances the current distribution among parallel branches of series connected rectifiers undergoing electroformation. This result is obtained in accordance with one embodiment of the invention by transforming current in the respective branches by means of mutual inductive coupling between the branches, and supplying to a higher resistance branch, a voltage induced by the transformation of current passing through a low resistance branch. The application of a higher voltage to the higher resistance branch causes more current to flow through this branch, thus forcing a substantially balanced current distribution among the branches. In addition to the transforming action, the current distribution is limited in a lower resistance branch by the voltage absorption or reactance drop of the portion of the inductance through which flows the current of the lower resistance branch.

It is therefore an object of this invention to provide new and improved methods of and apparatus for electroforming rectifier cells.

Another object of the invention is to provide a method of and apparatus for electroforming rectifier cells wherein substantially balanced current distribution is forced between parallel branches of series connected rectifier cells supplied from a single source of electroforming current.

Further objects and advantages of the present invention will be apparent from the following description, reference being had to the accompanying drawing wherein a preferred form of the present invention is clearly shown.

Figure 1:
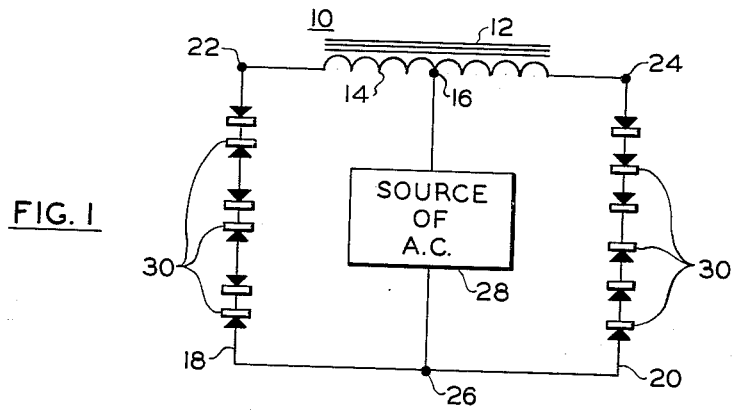
Figure 1 is a diagram of one embodiment of the invention as applied to a pair of parallel branches, each having a plurality of series connected rectifier cells.

As shown in Figure 1, one embodiment of the invention includes an inductive reactor 10 comprising a magnetizable core 12 and a winding 14 inductively coupled to the core, the winding being provided with a center tap 16. A pair of rectifier electroforming branches 18 and 20 are connected to opposite ends 22 and 24, respectively, of the winding 14, and to a common junction 26 which in turn is connected to one side of a source of alternating current 28, the other side of the source being connected to the center tap 16 of the winding 14. Thus, the apparatus is energized from the current source through the center tap 16 and the common junction 26. The advantages of the invention are obtainable in varying degrees with practically any type of alternating current source 28. However, a source of constant current alternating current, for example, a monocyclic square, is preferable.

Each of the branches 18 and 20 has connected therein, a plurality of rectifier cells 30, for example, metallic rectifier cells such as selenium cells or the like, which are to be electroformed. Although alternating current may be used to electroform cells polarized in the same direction, it is desirable to connect half the number of cells in opposition to the other half of the cells in the same branch as indicated in the drawing in order to utilize both halves of each alternating current cycle for electroforming. In order to maintain some semblance of initial balance, it is desirable to have the same number of rectifier cells in each of the branches. Obviously, this initial symmetry could be obtained even with a different number of rectifier cells in the respective branches by moving the center tap 16 to an off-center position with respect to the ends 22 and 24 of the reactor winding 14.

In operation, both the reactive and the autotransforming characteristics of the reactor 10 are utilized to force a balanced current distribution between the branches 18 and 20. For example, if during the electroforming, one of the cells in branch 18 is shorted due to a "burn out," the branch 18, because of lowered resistance, will draw more current, and, of course, more current will flow through the left side of the reactor 14 than will flow through the right side. In case the source 28 is not of constant potential, and in particular where the source 28 is constant current wherein a given value of current is supplied, any increase in current in the branch 18 results in a decrease in current in branch 20, thus undesirably raising the forming current through branch 18 and lowering it through branch 20. However, in case of such a short circuit, the increase of current in branch 18 is substantially checked by the increased reactance drop in the left half of the reactor 10 and additional current will be forced through the branch 20 by autotransformer action of the reactor 10. The increase of current through the left half of the reactor automatically increases, by reason of mutual induction, the voltage applied to the branch 20, thus forcing more current through the branch 20. The reactor will limit the current of branch 18 and by transformer action will force current through the branch 20 until a substantial balance of current distribution between the two branches is reached. Similarly, the reactor 10 will force more current through branch 18 in case the resistance of the branch 20 drops below that of branch 18 and excess current is drawn by branch 20. Thus, the reactor 10 operates continuously to force substantial current equalization between the two branches 18 and 20.

Figure 2:
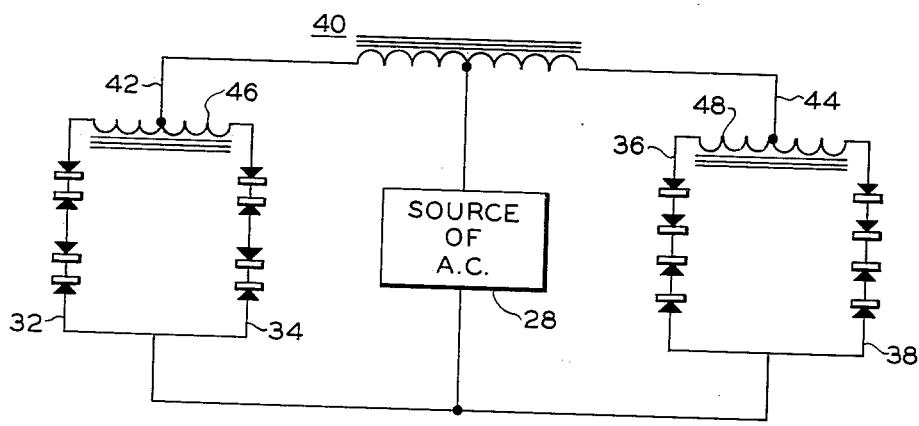
Figure 2 illustrates another embodiment of the invention as applied to a plurality of pairs of parallel electroforming branches.

Another embodiment of the invention is illustrated in Figure 2 wherein four branches 32, 34, 36, and 38, of series connected rectifier cells are electroformed simultaneously from a source of constant current. In this circuit, a center tapped reactor 40 forces substantial current balance between the legs 42 and 44, and reactors 46 and 48 force current balance between their respective associated branches.

Figure 3:
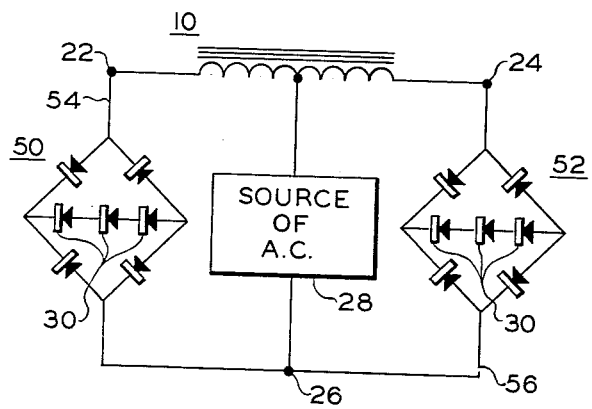
Figure 3 is a diagram showing the invention in connection with direct current forming.

The principles of the invention may be applied to direct current forming as shown in Figure 3, wherein series connected cells 30 undergoing electroformation are supplied with direct current by means of bridge rectifiers 50 and 52 in electroforming branches 54 and 56 connected between the junction 26 and the opposite ends of the reactor 10.

Although specific mention of selenium cells has been made, the invention is applicable to any type of semiconductive cell including metallic and electrolytic rectifier cells which require electroformation. Also, the cell load may be one cell or a plurality of cells in series.

While the form of embodiment of the invention as herein disclosed constitutes a preferred form, it is to be understood that other forms might be adopted, all coming within the scope of the claims which follow.

What is claimed is as follows:

1. An electroforming circuit comprising a pair of parallel connected electroforming branches, each branch having connected therein a plurality of formable rectifier cells, said branches being energizable with alternating current, an inductive winding in circuit with one of said branches, and a second inductive winding in circuit with the other of said branches, said windings being inductively coupled and operable in response to excess current in one branch to transform said current and induce additive voltage in the winding of the other branch, thereby to increase the current in said other branch.

2. An electroforming circuit comprising a pair of parallel connected electroforming branches, each branch having a plurality of formable rectifier cells connected therein, said branches being energizable with alternating current, and inductive means in each of said branches, said means being inductively coupled.

3. An electroforming circuit comprising a pair of parallel connected electroforming branches, each branch having a plurality of formable rectifier cells connected therein, said branches being energizable with alternating current, and mutual inductive coupling between said branches for forcing desired current distribution between said branches.

4. A rectifier electroforming circuit comprising a center tapped inductive winding, and a pair of electroforming branches, one end of each coupled to a common junction, the other ends of said branches being coupled to opposite ends of said winding, each of said branches comprising a plurality of formable rectifier cells, said circuit being energizable with alternating current through said center tap and said common junction.

5. An electroforming circuit comprising a pair of parallel connected electroforming branches, each branch having connected therein a plurality of formable rectifier cells, a source of alternating current connected across said branches, and means for forcing desired current distribution among said branches comprising an inductive winding in series with each branch, said windings being inductively coupled to each other.

6. An electroforming circuit comprising a pair of parallel connected branches, each branch including a bridge rectifier and at least one formable rectifier cell connected to the output of the bridge rectifier to receive electroforming current therefrom, a source of alternating current connected across said branches, and means for forcing desired current distribution among said branches comprising an inductive winding in series with each branch, said windings being inductively coupled to each other.

7. An electroforming circuit comprising a pair of parallel connected branches, each branch including a bridge rectifier and at least one formable rectifier cell connected to the output of the bridge rectifier to receive electroforming current therefrom, a source of constant current alternating current connected across said branches, and means for forcing desired current distribution among said branches comprising an inductive winding in series with each branch, said windings being inductively coupled to each other.

8. An electroforming circuit comprising a pair of parallel connected branches, each branch including a bridge rectifier and means for connecting at least one formable rectifier cell to the output of the bridge rectifier to receive electroforming current therefrom, a source of constant current alternating current connected across said branches, and means for forcing desired current distribution among said branches comprising an inductive winding in series with each branch, said windings being inductively coupled to each other.

9. An electroforming circuit comprising a pair of parallel connected electroforming branches, each branch having connected therein a plurality of formable rectifier cells, a source of constant current alternating current connected across said branches, and means for forcing desired current distribution among said branches comprising an inductive winding in series with each branch, said windings being inductively coupled to each other.

10. A rectifier electroforming circuit comprising a center-tapped inductive winding, a pair of electroforming branches, one end of each coupled to a common junction, the other ends of said branches being coupled to opposite ends of said winding, each of said branches comprising a plurality of formable rectifier cells, and a source of constant current alternating current connected between said center tap and said common junction.

11. An electroforming circuit comprising a center-tapped inductive winding, and a pair of electroforming branches, one end of each coupled to a common junction, the other ends of said branches being coupled to opposite ends of said winding, each branch including a bridge rectifier and means for connecting at least one formable rectifier cell to the output of said bridge rectifier to receive electroforming current therefrom, said circuit being energizable with alternating current through said center tap and said common junction.

12. An electroforming circuit comprising a center-tapped inductive winding, and a pair of electroforming branches, one end of each coupled to a common junction, the other ends of said branches being coupled to opposite ends of said winding, each branch including a bridge rectifier, and at least one rectifier cell connected to the output of said bridge rectifier to receive electroforming current therefrom, said circuit being energizable with alternating current through said center tap and said common junction.

13. An electroforming circuit comprising a center-tapped inductive winding, and a pair of electroforming branches, one end of each coupled to a common junction, the other ends of said branches being coupled to opposite ends of said winding, each branch including a bridge rectifier and at least one rectifier cell connected to the output of said bridge rectifier to receive electroforming current therefrom, and a source of constant current alternating current connected between said center tap and said common junction.

References Cited in the file of this patent

UNITED STATES PATENTS

| | | |
|---|---|---|
| 1,110,550 | Hewitt | Sept. 15, 1914 |
| 2,375,181 | Williams | May 1, 1945 |
| 2,497,649 | Amsden | Jan. 14, 1950 |